US 11,607,932 B2

(12) United States Patent
Couto Maquieira et al.

(10) Patent No.: US 11,607,932 B2
(45) Date of Patent: Mar. 21, 2023

(54) OPENING CONTROL DEVICE WITH EMERGENCY MECHANICAL UNLOCKING

(71) Applicant: AKWEL VIGO SPAIN SL, Vigo Pontevedra (ES)

(72) Inventors: Delmiro Javier Couto Maquieira, Pontevedra (ES); Alberto Diez Estevez, Pontevedra (ES); Javier Casal Gomez, Vigo (ES); Javier Gonzalez Novo, Vigo (ES)

(73) Assignee: AKWEL VIGO SPAIN SL, Vigo Pontevedra (ES)

( * ) Notice: Subject to any disclaimer, the term of this patent is extended or adjusted under 35 U.S.C. 154(b) by 797 days.

(21) Appl. No.: 16/356,277

(22) Filed: Mar. 18, 2019

(65) Prior Publication Data

US 2019/0291543 A1    Sep. 26, 2019

(30) Foreign Application Priority Data

Mar. 21, 2018    (FR) ...................... 18/70319

(51) Int. Cl.
*E05B 85/10*    (2014.01)
*B60J 5/04*    (2006.01)
(Continued)

(52) U.S. Cl.
CPC ............. *B60J 5/0416* (2013.01); *E05B 81/78* (2013.01); *E05B 81/90* (2013.01); *E05B 85/103* (2013.01);
(Continued)

(58) Field of Classification Search
CPC .......... E05B 81/90; E05B 81/78; E05B 85/10; E05B 85/103; E05B 85/107; Y10T 292/57
See application file for complete search history.

(56) References Cited

U.S. PATENT DOCUMENTS 3,993,338 A * 11/1976 Cherbourg ................. B60J 5/06
                                                                         292/336.3
4,728,133 A *  3/1988 Valley ....................... E05B 3/06
                                                                         292/336.3
(Continued)

FOREIGN PATENT DOCUMENTS

CN      105649437 A      6/2016
DE    102004054189 A1 *  5/2006 ............. E05B 79/20
(Continued)

OTHER PUBLICATIONS

U.S. Appl. No. 16/356,904, filed Mar. 18, 2019 in the name of Delmiro Javier Couto Maquieira et al.
(Continued)

*Primary Examiner* — Carlos Lugo
(74) *Attorney, Agent, or Firm* — Oliff PLC

(57) ABSTRACT

The opening control device includes a fixed support configured to be mounted on the door leaf, a handle movably mounted on the support, a mechanism for electrical and mechanical activation of an unlocking of a latch of the motor vehicle door leaf respectively for electrically and mechanically actuating the unlocking of the latch, the mechanism being mechanically coupled with the handle of the vehicle such that the application of a predefined pulling force on the handle causes the electrical or mechanical activation of the unlocking of the latch. The activation mechanism includes a first lever for electrical activation of the latch and a second lever for mechanical activation of the latch movably mounted relative to each other.

18 Claims, 4 Drawing Sheets

(51) Int. Cl.
*E05B 81/78* (2014.01)
*E05B 81/90* (2014.01)
*E05B 79/22* (2014.01)
*E05B 79/20* (2014.01)

(52) U.S. Cl.
CPC ............ *E05B 79/20* (2013.01); *E05B 85/107* (2013.01); *Y10T 292/57* (2015.04)

(56) References Cited

U.S. PATENT DOCUMENTS

| | | | |
|---|---|---|---|
| 4,889,373 | A | 12/1989 | Ward et al. |
| 5,685,584 | A * | 11/1997 | Baren ................... E05B 3/00 |
| | | | 292/348 |
| 6,460,905 | B2 | 10/2002 | Suss |
| 6,598,913 | B2 | 7/2003 | Meinke |
| 7,552,954 | B2 * | 6/2009 | Rozo ................... E05B 5/00 |
| | | | 292/143 |
| 7,866,714 | B2 * | 1/2011 | Monig ................. E05B 81/76 |
| | | | 292/336.3 |
| 8,579,337 | B2 * | 11/2013 | Hidding ................ E05B 7/00 |
| | | | 292/48 |
| 8,701,353 | B2 | 4/2014 | Patel et al. |
| 9,605,452 | B2 | 3/2017 | Yoshino et al. |
| 10,435,926 | B2 | 10/2019 | Brown et al. |
| 10,487,547 | B2 | 11/2019 | Malvy et al. |
| 10,563,437 | B2 | 2/2020 | Bartels et al. |
| 10,655,371 | B2 * | 5/2020 | Soonthornwinate .... E05B 81/76 |
| 10,794,096 | B2 | 10/2020 | Hamacher et al. |
| 10,954,702 | B2 | 3/2021 | Couto Maquieira et al. |
| 2016/0222705 | A1 | 8/2016 | Velicanin |
| 2016/0281397 | A1 | 9/2016 | Park et al. |
| 2018/0274271 | A1 | 9/2018 | Och et al. |
| 2019/0024422 | A1 * | 1/2019 | Inan ..................... E05B 77/12 |
| 2019/0218835 | A1 | 7/2019 | Karlein et al. |
| 2021/0156178 | A1 | 5/2021 | Heyduck et al. |

FOREIGN PATENT DOCUMENTS

| | | | | |
|---|---|---|---|---|
| DE | 10 2004 058 874 | A1 | 6/2006 | |
| DE | 102012210278 | A1 * | 12/2013 | ............ E05B 81/90 |
| DE | 10 2014 117 005 | A1 | 5/2016 | |
| DE | 102015011468 | A1 * | 3/2017 | ............ E05B 85/103 |
| DE | 102016101568 | A1 * | 8/2017 | ............ E05B 81/90 |
| DE | 102016113695 | A1 | 1/2018 | |
| DE | 102016217647 | A1 | 3/2018 | |
| EP | 3141679 | A1 | 3/2017 | |
| EP | 3255231 | A1 | 12/2017 | |
| FR | 2941994 | A1 * | 8/2010 | ............ E05B 81/25 |
| FR | 3023865 | A1 | 1/2016 | |
| FR | 3024173 | A1 | 1/2016 | |
| FR | 3026131 | A1 | 3/2016 | |
| FR | 3071861 | A1 | 4/2019 | |
| FR | 3087810 | A1 | 5/2020 | |
| GB | 2536672 | A | 9/2016 | |
| WO | 2016113339 | A1 | 7/2016 | |
| WO | 2018/137839 | A1 | 8/2018 | |

OTHER PUBLICATIONS

U.S. Appl. No. 16/356,770, filed Mar. 18, 2019 in the name of Delmiro Javier Couto Maquieira et al.
Aug. 25, 2021 Office Action issued in U.S. Appl. No. 16/356,904.
Mar. 1, 2022 Office Action issued in U.S. Appl. No. 16/356,770.
Apr. 15, 2022 Office Action Issued In U.S. Appl. No. 16/356,904.
Sep. 16, 2022 Office Action issued in U.S. Appl. No. 16/356,770.
Aug. 24, 2022 Notice of Allowance issued in U.S. Appl. No. 16/356,904.
Jan. 9, 2023 Office Action issued in U.S. Appl. No. 16/356,770.

* cited by examiner

OPENING CONTROL DEVICE WITH EMERGENCY MECHANICAL UNLOCKING

The present invention relates to an opening control device for a motor vehicle door leaf, cooperating with an electrically actuated latch, also known by «electronic latch» or «e-latch». The invention more particularly relates to an outer opening control device which comprises emergency mechanical unlocking means in case of failure of the electrical actuating means of the latch.

In a general manner, an outer opening control device comprises a fixed support configured to be mounted on the door leaf and a handle movably mounted on the support, for example pivotally mounted on the support by being rotatably hinged about an axis. The opening control device also comprises a mechanism, which when the handle is maneuvered by pulling, unlocks the latch thus allowing to open the door.

Generally, the opening of a motor vehicle door leaf, for example a door of the vehicle, is performed by means of a latch comprising a bolt secured to the door capable of cooperating with a strike secured to the bodywork. When opening the door from the outside of the vehicle, the bolt is disengaged from the strike by actuating the outer opening control device.

In conventional opening control devices, the pulling maneuver of the handle by a user drives a transmission lever configured to pull on an end of a cable, connected to the bolt of the latch. Thus, the action exerted on the handle, results, through the kinematic chain of the opening control device, in the disengagement of the bolt from the strike and therefore in the opening of the door. When the user releases the handle, it is returned to the rest position by a return spring.

Certain modern motor vehicles, particularly in a sophisticated vehicle range, may be equipped with an outer opening control device comprising a handle cooperating with an electronic latch, allowing to be actuated by a user with a reduced force relative to the pulling force required in the case of conventional mechanical handles. Indeed, a simple mechanical pulling pulse on the handle causes triggering an electro-motorized drive of the latch which electrically switches it from a locked state to an unlocked state. The mechanical pulse activates a micro-switch placed in the outer opening control device which sends an electrical signal to a vehicle on-board computer; the latter electrically controls the unlocking of the latch in response to this mechanical pulse. This gives the user a feeling of comfort and increased ergonomics. Particularly, the electronic latches provide numerous other advantages, such as a reduction in the complexity of the latch and the handle as well as a gain in weight and space in the cabin.

However, such handle systems with a latch electrical unlocking require providing a power supply in particular at the electrical latch, such as a battery, in order to operate. In case of failure of this power supply, the electrical unlocking handle is not usable and the user cannot enter the vehicle. It is therefore necessary to have an emergency mechanism allowing unlocking the vehicle door in particular when the battery does not have enough energy for the electrical unlocking mechanism to operate.

An opening control device of a motor vehicle door with an electronic latch is already known from the prior art, in particular from the European patent application EP3141679. This opening control device comprises a handle lever and an activation lever which cooperates with the handle lever via a handle column. When pulling the handle lever, the activation lever is driven from a rest position to a first electrical activation position then, in case of an electrical failure, after applying an additional pulling force, to a second mechanical activation position to actuate the latch, for example by pulling a Bowden cable. The activation lever comprises a driving element capable of cooperating with a curvilinear-shaped ramp.

The drawback of the prior art is that, on the one hand, it is necessary to provide a handle column to ensure transmitting the pulling force to the emergency unlocking mechanism and that, on the other hand, the emergency unlocking mechanism is relatively bulky. Furthermore, the mechanism allowing switching from an electrical activation position to a mechanical activation position is very sensitive to friction and dependent on the greasing conditions and the environmental conditions.

The invention aims at overcoming these drawbacks and providing an opening control device which is compact, robust allowing to simply performing a mechanical emergency unlocking.

To this end, the invention relates to an opening control device of a motor vehicle door leaf, of the type comprising:
  a fixed support configured to be mounted on the door leaf,
  a handle movably mounted on the support,
  a mechanism for electrical and mechanical activation of an unlocking of a latch of the motor vehicle door leaf comprising first and second respectively electrical and mechanical activation levers for unlocking the latch, the mechanism being mechanically coupled with the vehicle handle such that applying a predefined pulling force on the handle causes electrical or mechanical activation of the unlocking of the latch, characterized in that the first and second levers are mounted movable in rotation about a main axis and comprise respectively first and second rotary coupling means axially engaged one inside the other to cooperate such that the first electrical activation lever becomes movable from a first threshold of predefined pulling force corresponding to a first rotation angle of the handle and the mechanical activation lever becomes movable with the first lever from a second threshold of predefined pulling force corresponding to a second rotation angle greater than the first angle.

Thanks to the invention, the opening control device can control the latch in a mixed manner, in an electrical manner—in normal operation—and in a mechanical manner in case of unavailability of the electrical function. Furthermore, it is possible to electrically control or mechanically control the latch depending on the opening stroke of the handle.

The fact that the two levers can be movably mounted relative to one another and become movable only sequentially allows both a robust and compact design of the opening control device.

An opening control device according to the invention may furthermore include one or more of the following characteristics.

Preferably, the mechanism further comprises a transmission shaft axially extending along the main axis, mounted movable in rotation on the support and configured to transmit the rotation torque of the handle lever to the mechanism.

In a preferred embodiment, the first and second levers are mounted co-axially movable in rotation relative to each other. This allows a compact arrangement along a single axis.

In a preferred embodiment, the first and second levers are connected respectively to first and second elastic return members each configured to exert a return force to a locking position of the latch.

The two elastic return members allow defining the limit between the electrical operation and the mechanical operation. Thus, there is the electrical lever return spring for the electrical opening lever and the mechanical lever return spring for the mechanical opening lever.

Preferably, the first elastic member has a lower stiffness than the second elastic member does.

Thanks to the use of two different elastic members, the user will be able to feel an over-stress or a hard point when switching from electrical operation to mechanical operation and prevent the unexpected mechanical actuation of the mechanical opening by applying an excessive force by the user.

In a preferred embodiment, the first lever or the second lever comprises a casing which is open at one of its ends and provided with a cover at the other end and an inner lateral annular partition delimiting on either side of the partition an inner annular space and an outer annular space for receiving the two elastic members concentrically relative to each other.

Preferably, the casing comprises a discontinuous outer peripheral sidewall delimiting with the inner partition the outer annular space.

Preferably, the first lever comprises means for activating electronic means capable of producing a detection signal of the rotation of the first lever for controlling the electrical unlocking of the latch.

In a preferred embodiment, the first lever comprises a rotation detection part with a cam profile mounted secured in rotation to the first lever capable of cooperating by contact with a cam follower of the electronic means.

For example, the detection part is formed by the casing cover.

Preferably, the first lever and the second lever are axially assembled one inside the other, preferably by nesting or fitting, free in rotation relative to each other on the inside.

Preferably, the two levers are mounted on the shaft, the first lever being rotatably secured to the shaft.

In a preferred embodiment, the second lever comprises mechanical connection means to a mechanical transmission element of the latch, such as a cable.

In a preferred embodiment, the second lever comprises a support forming a pedestal of the activation mechanism, the pedestal being provided with a base comprising a housing in which an end of a cable can be introduced and held forming the mechanical connection means.

Preferably, the opening control device comprises a shaft rotatably mounted on the support and on which the two levers are coaxially mounted, the first lever being rotatably secured to the shaft.

Preferably, the shaft comprises a radial extension fin capable of cooperating with an element of the handle.

Preferably, the coupling means comprise a central rod and a cylindrical sleeve provided with a hollow body for receiving therein the rod which is free in rotation in a limited rotation range, for example a quarter-turn type range.

In a preferred embodiment, the first lever comprises a central rod provided with a hollow body to be axially mounted on the shaft and the second lever comprises a cylindrical sleeve provided with a hollow body for receiving therein the rod which is free in rotation in a limited rotation range, for example a quarter-turn type range.

For example, the rod and the sleeve comprise respectively outer and inner walls provided with circumferential connection elements of the slots and legs type, particularly of the bayonet type.

Preferably, the first lever and the rotation shaft are rotatably coupled by a spline type connection.

In a preferred embodiment, the opening control device comprises a means for limiting rotation of the first lever relative to the second lever in a predetermined rotation range including an end of rotation stroke abutment beyond which the two levers are rotatably secured.

Other characteristics and advantages of the invention will become apparent in light of the description that follows, made with reference to the appended drawings in which.

Figure 1:
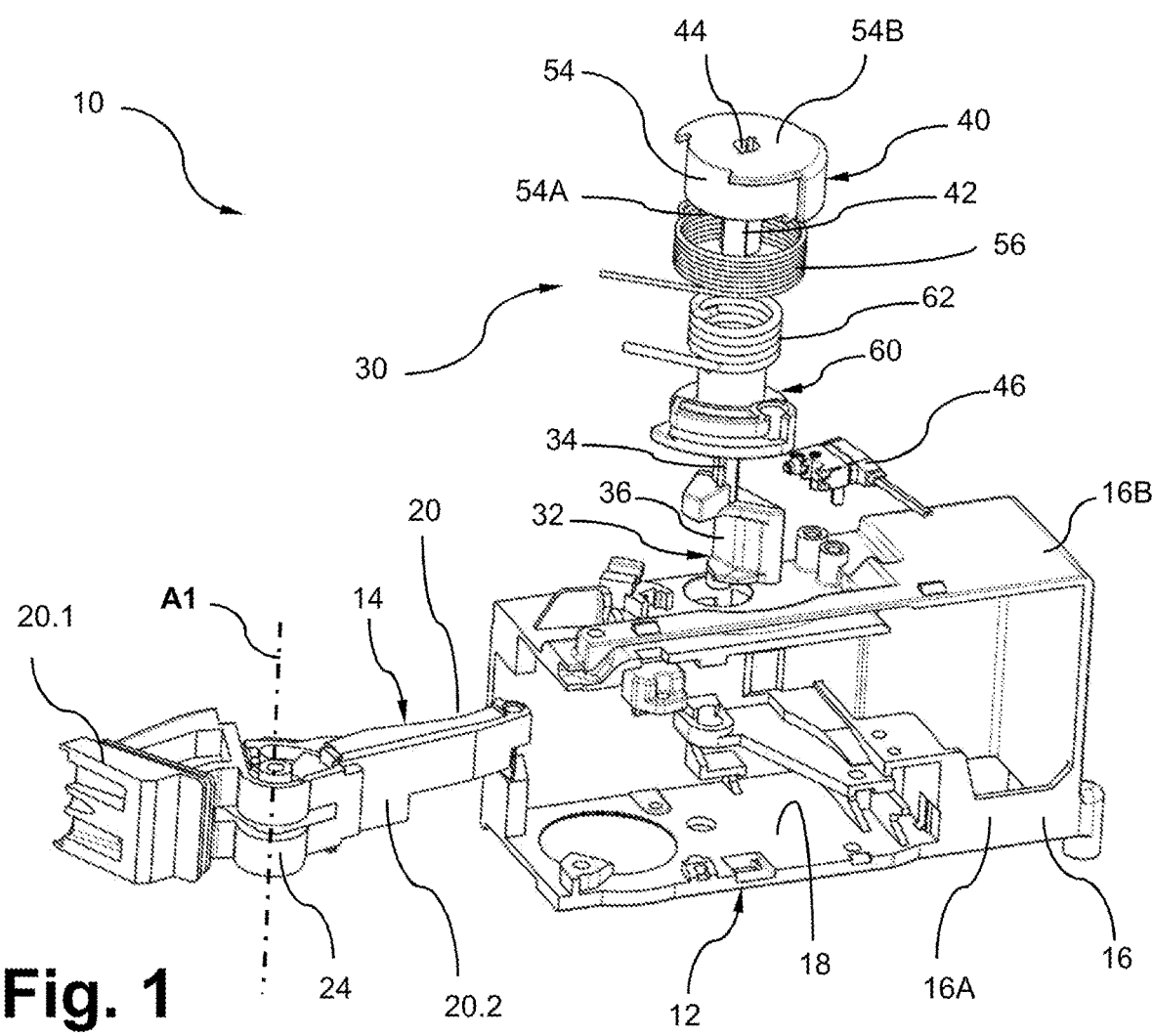
FIG. 1 shows an exploded perspective view of an opening control device of a door leaf according to the invention.

An opening control device of a motor vehicle door leaf was schematically shown in FIG. 1 according to the invention. The opening control device is designated by the general reference 10.

The opening control device 10 is provided to be mounted on an outer panel (not shown) of a bodywork of a door leaf which is for example a vehicle side door.

The opening control device 10 essentially includes a handle fixed support 12 and a handle 14 movably mounted on the support 12. In use, the support 12 is configured to be fixed to the door leaf. In the described example, the handle 14 is hingedly mounted relative to the panel, about a geometric pivoting axis A1, on the support 12. The pivoting axis A1 here is substantially vertical and extends parallel to the general plane of the outer panel.

In the illustrated example, the support 12 comprises a casing 16. The casing 16 has for example a generally parallelepipedic shape and is adapted to be housed into a cutout or a recess of the outer panel of the door leaf such that its outer face 16A is flush with the surface of the outer panel of the door leaf. The casing 16 is moreover open on the side of its outer face 16A and closed by a bottom 16B on the inner side in order to delimit a housing 18 configured to house the handle 14.

Figure 2:
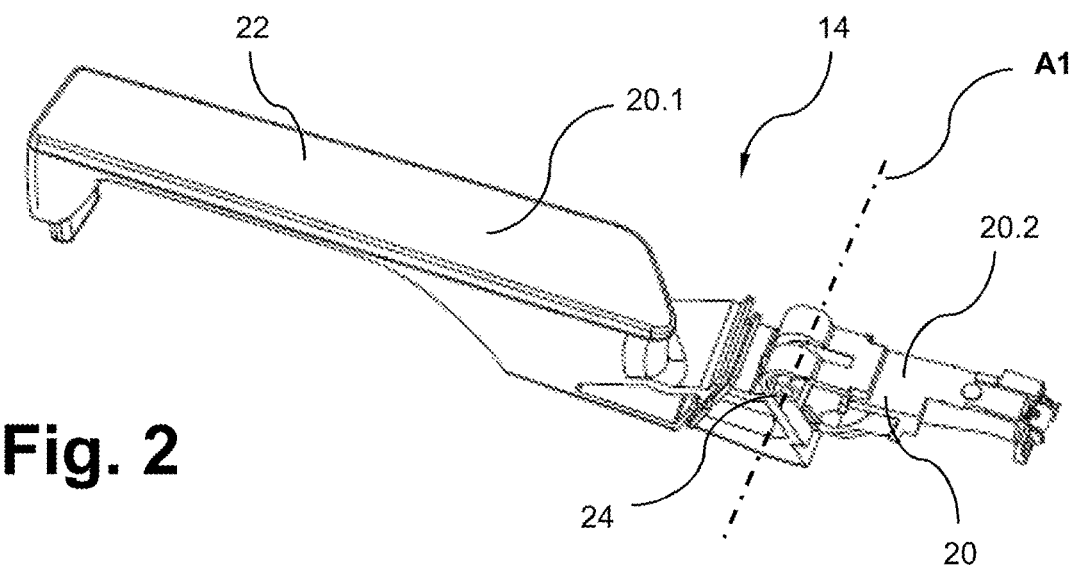
FIG. 2 shows a perspective view of a handle movably mounted inside the opening control device of FIG. 1.

The handle 14 is shown in detail in FIG. 2. The handle 14 comprises a lever 20 configured for gripping by a user. To this end, the lever 20 has an outer section 20.1 that the user can grasp and which is illustrated only partially in FIG. 1 and in its entirety in FIG. 2. Opposite the outer section 20.1, the lever 20 has an inner section 20.2 which is configured to extend inside the housing 18 of the casing 16 as visible in FIG. 2. Conventionally, on the outer section 20.1, the lever 20 includes a gripping pallet 22, which has a generally flat and elongated shape.

In the described example, the handle 14 is of the «flush» type that is to say that the support 12 on which the handle 14 is movably mounted forms a cavity 18 capable of receiving the handle 14 in the retracted configuration. In this configuration, the outer surface of the handle 14 is flush with the outer surface of the outer wall of the door leaf. In the extended or deployed configuration, the handle 14 at least partially leaves the cavity 18 of the support 12 so that it can be grasped by a user of the vehicle in order to open the door. For this purpose, the user can further displace the handle 14 outwards in order to control the latch of the door in order to open it.

However, it is understood that other movable mountings are possible, such as in particular by pivoting along an axis located at another position or else by translating along a direction essentially perpendicular to the mean plane of the door. It should also be noted that the movable mounting of the handle relative to the support is known per se by the one skilled in the art.

As can be seen in FIG. 1, the casing 16 has a housing 18 inside which the inner section 20.2 of the lever 20 is configured to be housed. The lever 20 is preferably rotatably movable relative to the casing 16. To this end, the opening control device 10 comprises a hinge 24 about which the lever 20 is rotatably hinged.

This opening control device 10 is configured to cooperate with a latch (not shown) of the motor vehicle door leaf likely to adopt a locked configuration and an unlocked configuration. Conventionally, the pivoting of the handle 14 lever 20 about its hinge axis A1 actuates the latch in either of its two locked or unlocked configurations.

In accordance with the invention, the opening control device 10 further comprises a mechanism 30 for electrical and mechanical activation of an unlocking of the latch respectively for electrically actuating and mechanically actuating the unlocking of the latch. Particularly, the mechanism 30 is mechanically coupled with the handle 14 of the vehicle such that the application of a predefined pulling force on the handle 14 causes the electrical or mechanical activation of the unlocking of the latch.

To this end, the opening mechanism 30 further comprises a transmission shaft 32 rotatably mounted on the support 12 and extending along this main axis A2. In order to transmit rotation of the handle 14 lever to the mechanism 30, the shaft 32 comprises a rod 34 longitudinally extending along the main axis A2 and a protruding fin 36 radially extending from the rod 34 configured to cooperate with the handle lever 20. Thus, the fin 36 is for example shaped to cooperate with the end of the handle lever 20. The fin 36 comprises for example a curvilinear profile in order to adapt to the shape of the lever end 20.2.

Figure 3:
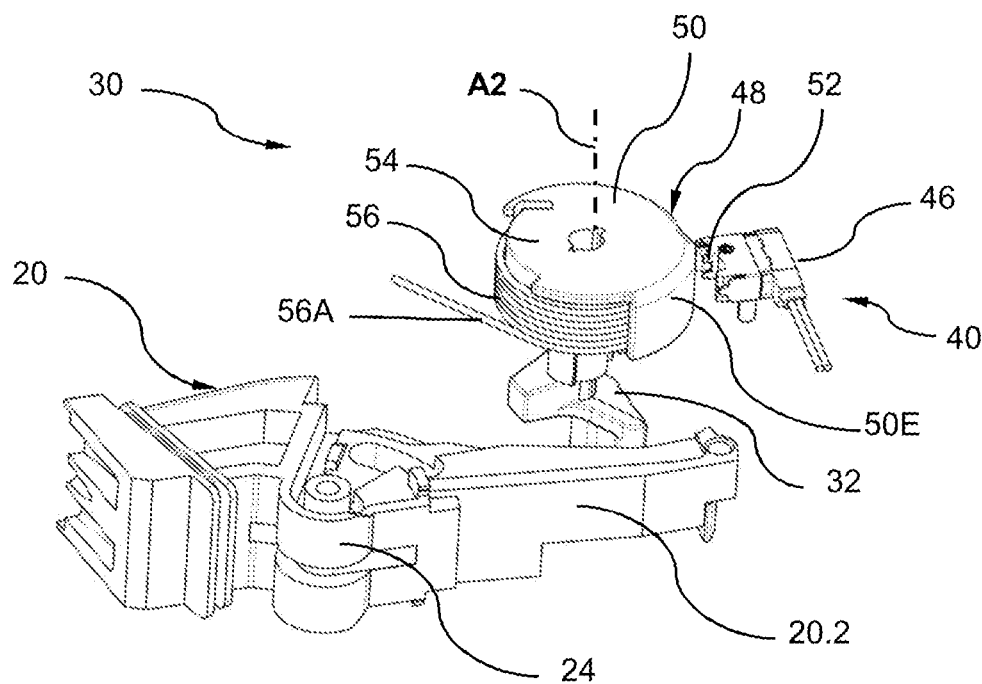
FIG. 3 is an enlarged scale perspective view of an electrical activation mechanism of the opening control device of FIG. 1.
Figure 4:
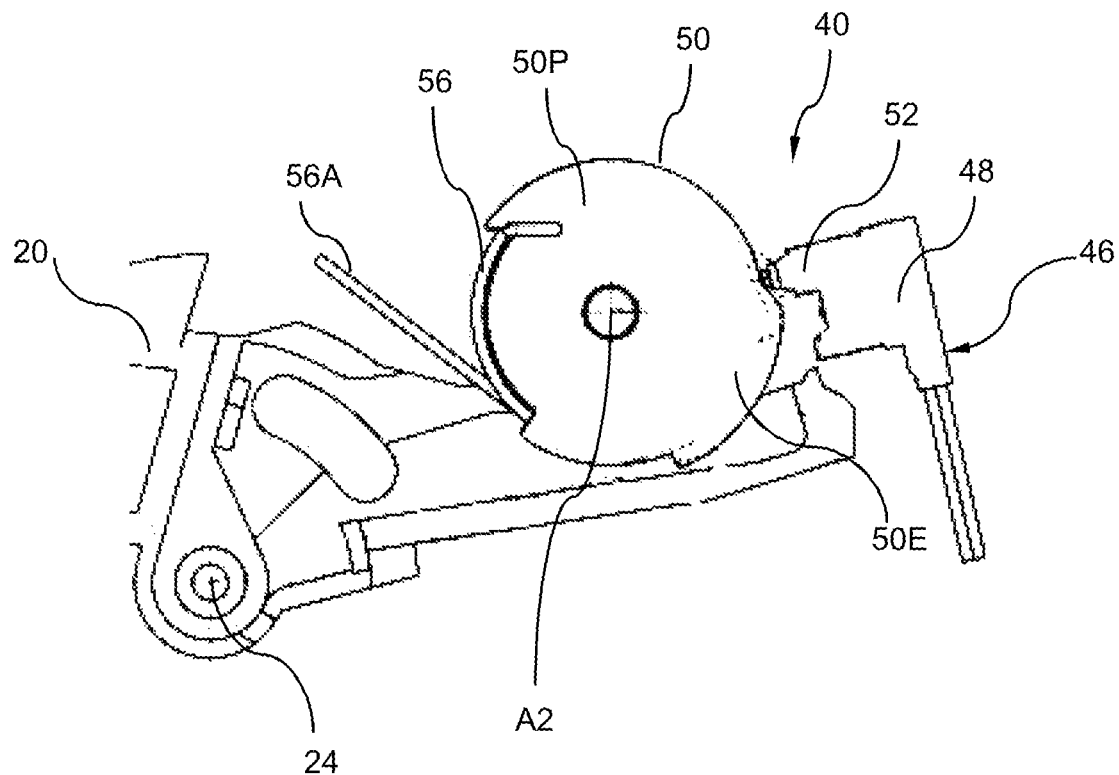
FIG. 4 is a top view of the mechanism of FIG. 3.

In accordance with the invention, the activation mechanism 30 comprises a first lever 40 for electrical activation of the latch illustrated in detail in FIGS. 3 and 4.

According to the invention, this first activation lever 40 becomes movable from a first threshold of predefined pulling force applied on the handle lever 20 corresponding to a first pivoting angle α of the handle 20. Preferably, the first lever 40 is mounted movable in rotation about the main axis A2 of the mechanism 30. The first lever 40 is rotatably linked in this example to the shaft 32 which allows transmitting rotation forces.

To this end, as visible in FIG. 4, the first lever 40 comprises a central rod 42 provided with a hollow body forming a hub body in order to be axially mounted on the rotation shaft 32. For example, the first lever 40 and the rotation shaft 32 are rotatably coupled by a connection of the shaft-hub type. For example, the rotation shaft 32 comprises a predefined outer connection region with a complementary inner connection region of the central rod 42. These connection regions are for example of the spline 44 type. Thus, the shaft 32 and the rod 42 are guided one inside the other by the splines 44. Of course, other rotational connection couplings of the shaft 32 and the first lever 40 may be suitable without departing from the scope of the invention.

Furthermore, the opening control device 10 further comprises electronic detection means 46 capable of producing an electrical signal for detecting a predefined angular position of the first lever 40 in order to control the electrical unlocking of the latch (not shown). These electronic means 46 comprise for example a mechanical contact sensor such as a switch, a microswitch, a Hall effect sensor or other, capable of generating an electrical signal.

Preferably, the first lever 40 comprises means 48 for activating these electronic means 46. For example, the activation means 48 comprise a rotation detection part 50 with a cam profile mounted secured in rotation with the first lever 40 capable of cooperating by contact with a cam follower 52 of the electronic means 46.

In the example illustrated in FIG. 4, the cam profile 50 comprises a circular main portion 50P defined by a disc of constant radius centered on the main axis A2 of the opening mechanism 30. Furthermore, the cam profile 50 comprises a tooth-shaped eccentric ramp portion 50E to actuate the switch 46. The switch 46 is for example mounted on a shaft (not shown), facing the ramp section 50E of the cam profile 50. Upon rotation of the part 50 and passage of the tooth 50E at the level of the cam follower 52, the switch 46 triggers a change of electrical state transmitted to an on-board computer of the motor vehicle.

As illustrated in the perspective view of FIG. 3, the first lever 40 comprises a casing 54 which is open at one of its ends 54A and provided with a cover 54B at the other end, the cover 54B forming the detection part 50.

The first lever 40 furthermore comprises an elastic return member 56 configured to exert a return force to a locking position of the latch. This elastic return member 56 is for example connected on the one hand to the first lever 40 and on the other hand to the support 12. The elastic return member 56 comprises in this example a first helical torsion spring.

Figure 5:
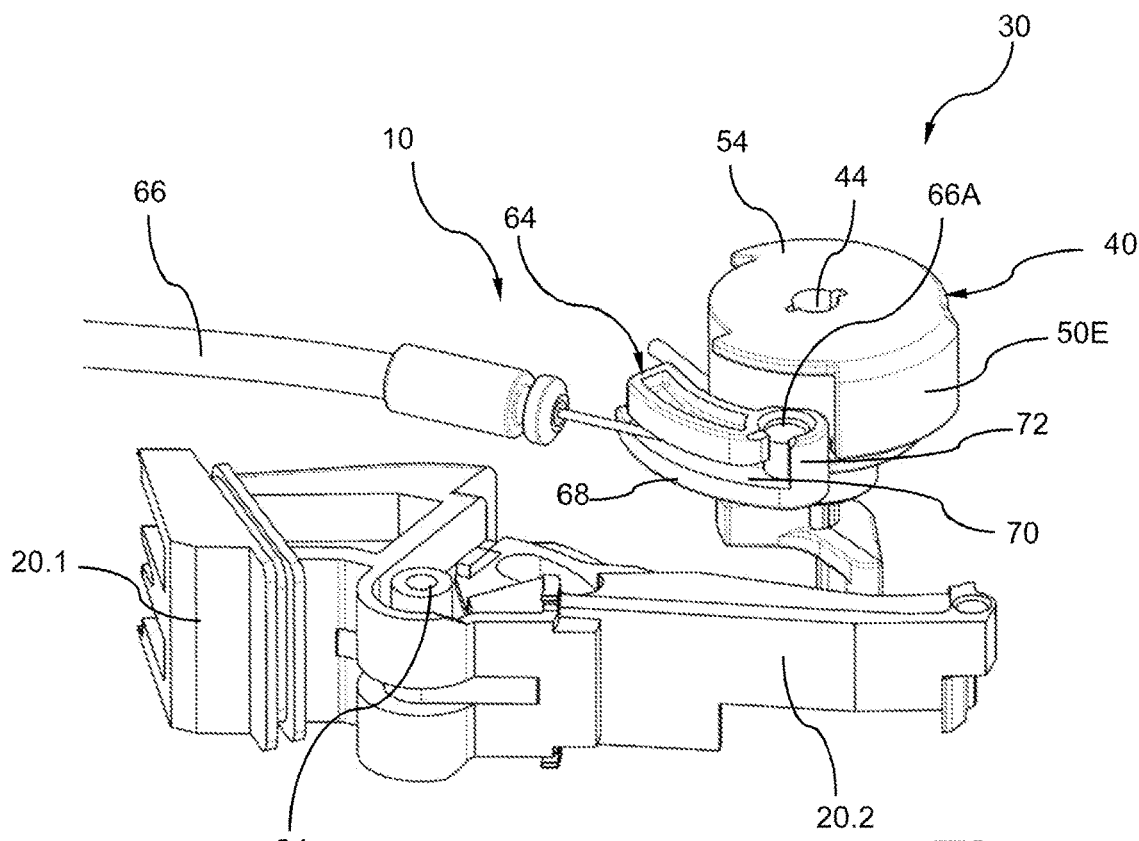
FIG. 5 is an enlarged scale perspective view of a mechanical activation mechanism of the opening control device of FIG. 1.
Figure 6:
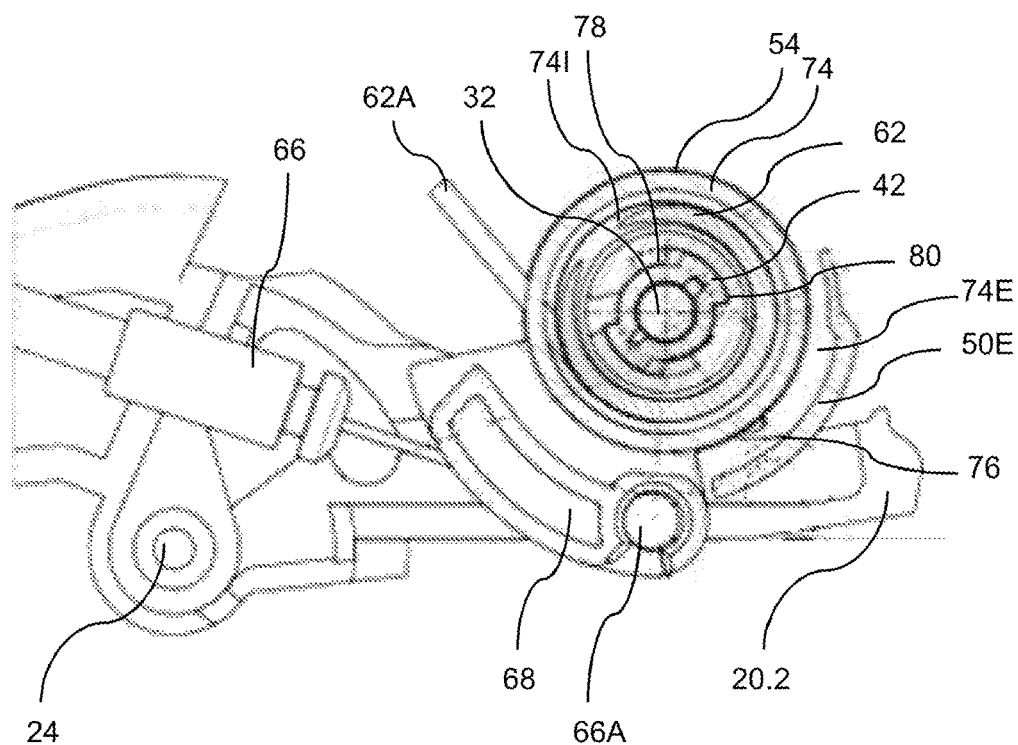
FIG. 6 is a cross-sectional view of the mechanism of FIG. 5.

In accordance with the invention, the mechanism 30 also comprises a second lever 60 for mechanical activation of the latch illustrated in detail in FIGS. 5 and 6. This second activation lever 60 is connected to a second elastic member 62 configured to exert a return force to a locking position of the latch. This second elastic member 62 also comprises a helical torsion spring. This elastic member 62 is connected on the one hand to the second lever 60 and on the other hand to the support 12. The springs 56 and 62 are for example of the cylindrical torsion type with coils and are preferably concentrically mounted on the axis A2.

In the described example, the second lever 60 comprises mechanical connection means 64 to a mechanical transmission element of the latch, such as a Bowden cable 66.

Structurally, the second lever 60 comprises a support 68 forming a pedestal of the activation mechanism 30, the pedestal being provided with a base comprising a housing in which an end 66A of a cable 66 can be introduced and held in order to form the mechanical connection means.

In the example illustrated in FIGS. 5 and 6, the cable 66 comprises a sheath provided at its proximal end 66A with a head forming an element for holding the cable 66 inside the housing 68. The housing 68 has, for example a body of a generally curved shape provided with a circumferential slot delimiting a guide groove 70 through which the sheath of the cable 66 can be radially inserted and opening onto an axial extension orifice through which the cable head 66A can be removably axially engaged.

In accordance with the invention, the first 40 and second 60 levers are movably mounted relative to each other about a main axis.

Furthermore, according to the invention, the first 40 and second 60 levers comprise respectively first 42 and second 80 rotary coupling means axially engaged one inside the other to cooperate such that the first electrical activation lever 40 becomes movable from a first threshold of predefined pulling force corresponding to a first rotation angle α of the handle 14 and the second mechanical activation lever 60 becomes movable from a second threshold of predefined pulling force greater than the first threshold corresponding to a second rotation angle δ greater than the first angle α.

In order to perform this operation, the first elastic member 56 has, for example, a stiffness lower than the second elastic member 62 does.

Preferably, the first 40 and second 60 levers are coaxially mounted movable in rotation relative to each other. Preferably and as illustrated in FIG. 1, the two levers 40 and 60 are coaxially mounted on the rotation shaft 32.

In order to house the two elastic return members 56 and 62, in the described example, the casing 54 of the first lever 40 delimits a housing for both the first return member 56 and the second return member 62. Preferably, the casing 54 comprises a cylindrical cage provided with an inner annular partition 74 delimiting on either side of the partition 74 an inner annular space 74I around the central rod 42 and an outer annular space 74E for the concentric reception of the two elastic members 56 and 62 concentrically relative to each other.

Furthermore, the casing 54 comprises a discontinuous outer peripheral sidewall 76 delimiting with the inner partition 74 the outer annular space 74E.

Preferably, as illustrated in detail in FIG. 6, the mechanism 30 further comprises a means 78 for limiting rotation of the first lever 40 relative to the second lever 60 in a predetermined rotation range including an end of rotation stroke abutment beyond which the two levers 40 and 60 are rotatably secured.

Preferably, the first lever 40 and the second lever 60 are axially assembled one inside the other, preferably by nesting or fitting, which are free in rotation relative to each other within a predefined rotation range, for example a quarter-turn range.

For example, the second lever 60 comprises a cylindrical sleeve 80, forming in this example the second rotary coupling means provided with a hollow body for receiving therein the central shaft 42, which is free in rotation, forming the first rotary coupling means of the first lever 40 in a limited rotation range, for example a quarter-turn type range. To this end, for example, the rod 42 and the sleeve 80 comprise respectively outer and inner walls provided with circumferential connection elements of the slots and legs type, particularly of the bayonet type forming the rotation limiting means 78.

Figure 7:
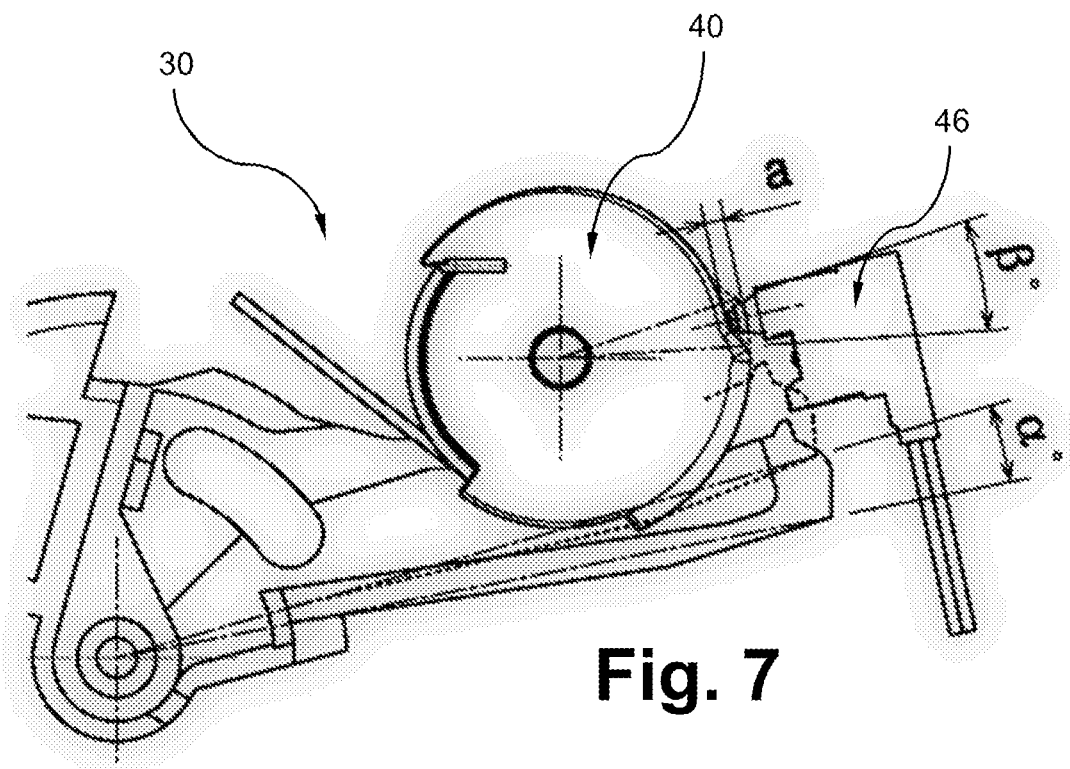
FIGS. 7 and 8 are schematic representations of the electrical and mechanical activation mechanism of FIG. 1 illustrating the main aspects of its operation.
Figure 8:
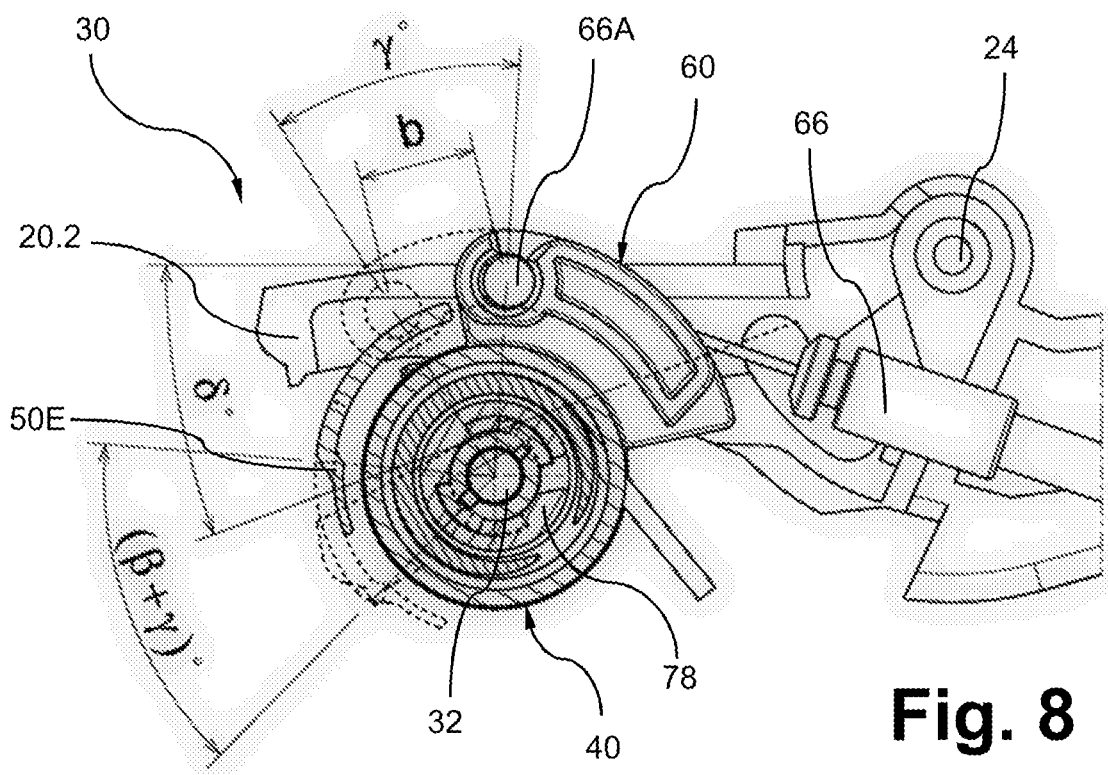

The main aspects of an opening control device will now be described with reference to FIGS. 7 and 8 according to the invention.

Initially, the handle 14 is in a retracted configuration. In this configuration, the latch connected to the handle 14 by the latch driving kinematic chain is in a locked configuration.

In a first step, a user applies a first pulling force on the handle 14 below a first threshold.

Beforehand, in the case of a handle called flush handle, the user must slightly push the handle 14 inwards to allow said handle to enter the cavity under the effect of a pressure exerted on said handle from the outside to the receiving cavity, in order to switch from the retracted configuration to the deployed configuration. The retracted configuration corresponds to the configuration called «flush» configuration.

The first pulling force has the effect of rotating the shaft 32 via the fin 36 and the control arm 20.2 of the lever 20. Thus, as illustrated in FIG. 7, due to the first pulling force the lever 20 performs a rotation by an angle «α» which has the effect of turning the shaft 32 by an angle «β».

As the shaft 32 and the first lever 40 comprise splined connection regions, the first lever 40 and the shaft 32 are rotatably secured and the first lever 40 performs a rotation by an angle «β». The rotation by an angle «β» causes the passage of the tooth 50E at the level of the cam follower 52 which has the effect of causing the cam follower to displace by a distance «α». This displacement has the effect of triggering an electrical action of the motor vehicle electronic means 46 causing electrically unlocking the door leaf.

The second lever 60 remains stationary. Indeed, the displacement of the first lever 40 takes place within the limit of the quarter-turn range, so that the rotation of the first lever 40 by an angle «α» does not produce the effect of driving in rotation the second lever 60.

During a second step, for example upon electrical failure, the user continues the pulling force of the handle until reaching a second mechanical activation threshold. This causes rotating the control lever 20.2 by an angle «δ».

In this case, the shaft 32 then turns by an additional angle «γ» and the first lever 40 secured to the shaft 32 as well. This additional rotation causes the abutment of the central rod 42 of the first lever 40 against the sleeve 80 of the second lever 60 via the bayonet connection. The first lever 40 and the second lever 60 become rotatably secured so that the base 68 is displaced by a distance «b» which causes a pulling of the Bowden cable. This pulling of the cable results in the mechanical unlocking of the latch.

The invention is not limited to the previously described embodiments. Other embodiments within the reach of one skilled in the art can also be envisaged without departing from the scope of the invention defined by the claims below.

The invention claimed is:

1. An opening control device for a motor vehicle door leaf, comprising:
   a support fixedly mounted on the door leaf,
   a handle movably mounted on the support,
   electrical actuation means for electrically actuating an unlocking of the motor vehicle door leaf,
   mechanical actuation means for mechanically actuating the unlocking of the motor vehicle door leaf, and
   a mechanism comprising:
      a first lever for activation of the electrical actuation means, the first lever comprising first coupling means, and
      a second lever for activation of the mechanical actuation means, the second lever comprising second coupling means,
   the mechanism being mechanically coupled with the handle, and
   the first lever and the second lever being rotatably mounted about a common main axis, the first coupling means and the second coupling means being assembled one inside the other and cooperate such that:
      the first lever and the second lever are free to rotate relative to each other within a predefined rotation range, when the handle is pulled a first amount by a user, the first lever becomes movable a first rotation angle of the handle and activates the electrical actuation means, and when the handle is pulled a second amount by the user after the user pulls the handle by the first amount, the second lever becomes movable with the first lever a second rotation angle of the handle greater than the first rotation angle and activates the mechanical actuation means.

2. The opening control device according to claim 1, wherein the mechanism further comprises a transmission shaft axially extending along the common main axis, rotatably mounted on the support and configured to transmit a rotation torque from the handle to the mechanism.

3. The opening control device according to claim 2, wherein the first lever and the second lever are mounted on the transmission shaft, the first lever being rotatably secured to the transmission shaft.

4. The opening control device according to claim 2, wherein the first lever and the transmission shaft are rotatably coupled by a shaft-hub connection.

5. The opening control device according to claim 2, wherein the lever comprises a handle lever and the transmission shaft comprises a rod longitudinally extending along the common main axis and a protruding fin radially extending from the rod, the protruding fin being configured to cooperate with an inner section of the handle.

6. The opening control device according to claim 1, wherein the first coupling means and the second coupling means comprise a central rod and a cylindrical sleeve provided with a hollow body for receiving therein the central rod, the central rod being free in rotation in a limited rotation range.

7. The opening control device according to claim 6, wherein the central rod and the cylindrical sleeve comprise respectively an outer wall and an inner wall provided with circumferential connection elements, the circumferential connection elements comprising slots and legs.

8. The opening control device according to claim 1, comprising a limitation means for limiting a rotation of the first lever relative to the second lever in a predetermined rotation range, the limitation means including a rotation end stroke abutment beyond which the first lever and the second lever are rotatably secured.

9. The opening control device according to claim 1, wherein the motor vehicle door leaf comprises a latch and the first lever and the second lever are connected respectively to a first elastic return member and a second elastic return member, each configured to exert a return force.

10. The opening control device according to claim 9, wherein the first elastic return member has a stiffness lower than the second elastic return member.

11. The opening control device according to claim 9, wherein the first elastic return member and the second elastic return member are concentrically arranged relative to each other.

12. The opening control device according to claim 9, wherein one of the first lever and the second lever comprises a casing which is open at one end and provided with a cover at another end and an inner lateral annular partition delimiting an inner annular space and an outer annular space from each other, the inner annular space and the outer annular space receiving the first elastic return member and the second elastic return member concentrically relative to each other.

13. The opening control device according to claim 12, wherein the casing comprises a discontinuous outer peripheral sidewall delimiting with the inner partition the outer annular space.

14. The opening control device according to claim 1, wherein the first lever comprises means for activating electronic means capable of producing a detection signal of the rotation of the first lever for controlling the electric unlocking of the motor vehicle door leaf.

15. The opening control device according to claim 14, wherein the first lever comprises a rotation detection part provided with a cam profile mounted secured in rotation to the first lever and capable of cooperating by contact with a cam follower of the electronic means.

16. The opening control device according to claim 15, wherein the rotation detection part is formed by a casing cover of the first lever.

17. The opening control device according to claim 1, wherein the second lever comprises mechanical connection means to a mechanical transmission element of a latch of the motor vehicle door leaf.

18. The opening control device according to claim 17, wherein the second lever comprises a support forming a pedestal of the mechanism, the pedestal being provided with a base comprising a housing in which an end of a cable can be introduced and held forming the mechanical connection means.

* * * * *